US012079553B1

(12) United States Patent
Liu et al.

(10) Patent No.: US 12,079,553 B1
(45) Date of Patent: Sep. 3, 2024

(54) METHOD, MEDIUM AND SYSTEM FOR DETERMINING DEMOLITION POINTS OF LARGE BUILDING

(71) Applicant: China Construction Industrial & Energy Engineering Group Huanghe Construction Co., Ltd., Jinan (CN)

(72) Inventors: Jie Liu, Jinan (CN); Chunyuan Tang, Jinan (CN); Hui Chen, Jinan (CN); Hongyuan Gao, Jinan (CN); Daoming Li, Jinan (CN); Huachao Yu, Jinan (CN); Yafei Zhao, Jinan (CN)

(73) Assignee: China Construction Industrial & Energy Engineering Group Huanghe Construction Co., Ltd., Jinan (CN)

( * ) Notice: Subject to any disclaimer, the term of this patent is extended or adjusted under 35 U.S.C. 154(b) by 0 days.

(21) Appl. No.: 18/433,337

(22) Filed: Feb. 5, 2024

(30) Foreign Application Priority Data

Jul. 24, 2023 (CN) .......................... 202310903779.7

(51) Int. Cl.
*G06F 30/23* (2020.01)
*E04G 23/08* (2006.01)
*G06F 119/14* (2020.01)

(52) U.S. Cl.
CPC ............. *G06F 30/23* (2020.01); *E04G 23/08* (2013.01); *G06F 2119/14* (2020.01)

(58) Field of Classification Search
CPC ....... G06F 30/23; G06F 2119/14; E04G 23/08
See application file for complete search history.

(56) References Cited

U.S. PATENT DOCUMENTS

2021/0310265 A1* 10/2021 Chu ......................... B66F 3/24
2024/0159074 A1* 5/2024 Tsampras .............. E04H 9/0215

FOREIGN PATENT DOCUMENTS

| CN | 107391793 A | 11/2017 |
| CN | 110593602 A | 12/2019 |
| CN | 111576921 A | 8/2020 |

* cited by examiner

*Primary Examiner* — Jack Chiang
*Assistant Examiner* — Brandon Bowers
(74) *Attorney, Agent, or Firm* — Nitin Kaushik

(57) ABSTRACT

The present invention provides a method, medium, and system for determining demolition points of a large building, which falls within the technical field of building demolition and construction. The method for determining demolition points of a large building includes: establishing a three-dimensional model of a large building to be demolished; analyzing, based on the three-dimensional model of the large building to be demolished, a force condition of each point to form a three-dimensional force model; calculating, based on the three-dimensional force model of the large building to be demolished, to obtain a demolition point tree of the building; and marking each demolition point in a demolition point sequence in the three-dimensional model of the large building to be demolished. In the process of multi-point synchronous demolition of large buildings, the demolition points of large buildings can be located according to the automatic analysis of the demolition order.

6 Claims, 1 Drawing Sheet

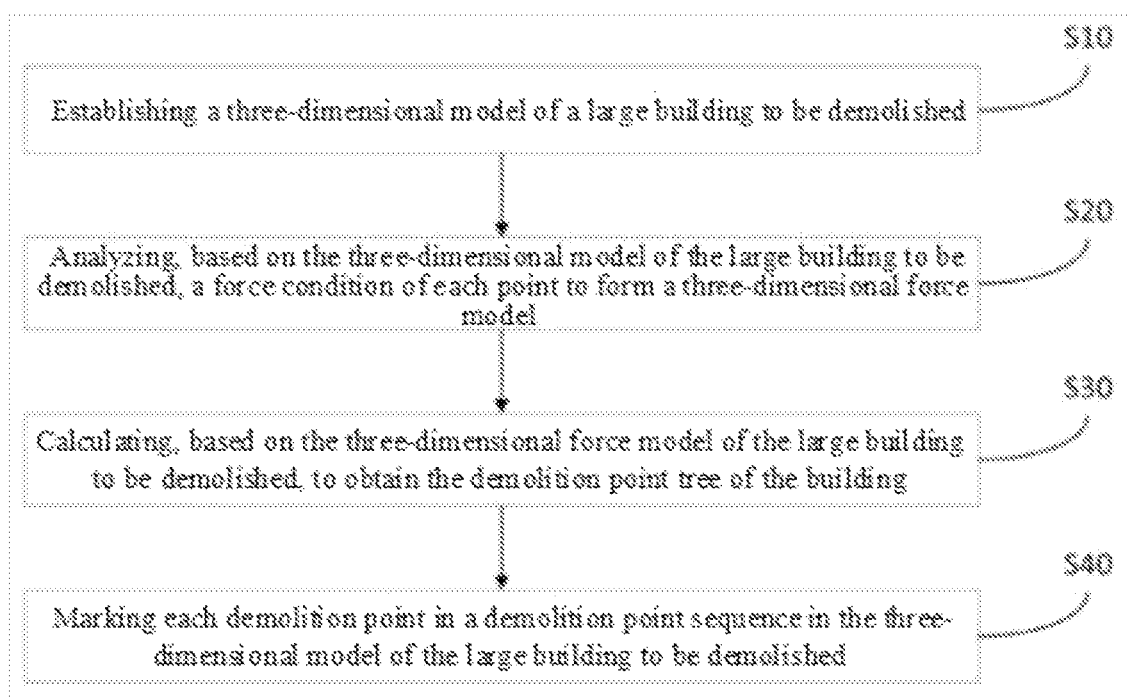

METHOD, MEDIUM AND SYSTEM FOR DETERMINING DEMOLITION POINTS OF LARGE BUILDING

CROSS-REFERENCE TO RELATED APPLICATIONS

The application claims priority to Chinese patent application No. 2023109037797, filed on Jul. 24, 2023, the entire contents of which are incorporated herein by reference.

TECHNICAL FIELD

The present invention belongs to the field of construction technology for building demolition. Specifically, it relates to a method, medium, and system for determining demolition points of a large building.

BACKGROUND

With the rapid development of urban construction, the number of large buildings is increasing. However, these buildings may need to be demolished after a certain period of time for various reasons. Since the demolition of large buildings involves many factors, such as the safety of the surrounding environment, the efficiency of demolition, and so on, it is necessary to determine the appropriate demolition points before the demolition of large buildings, so as to ensure the safety, efficiency, and environmental friendliness of the demolition process. However, existing methods for determining demolition points have certain limitations, such as difficulty in accurately estimating the safety of demolition points and low demolition efficiency.

Existing methods for determining demolition points of large buildings mainly include:

Area demolition method: the building is gridded to several demolition areas, the demolition points of each area are determined respectively, and then demolition is performed in a certain order. This method can improve the efficiency of demolition, but there are still certain limitations, such as the inability to accurately estimate the safety of the demolition point, and the impact of regional division on the demolition effect.

Weak point demolition method: according to the structural characteristics of the building, the weak point is determined as the demolition point. This method can improve the safety of demolition, but the demolition efficiency is low and requires a detailed analysis of the structure of the building, making the operation difficult.

Dynamic demolition method: the demolition can be achieved by applying an external force to the building, such as blasting, pulling, etc. so as to generate a dynamic response. This method can improve demolition efficiency, but it poses certain safety hazards and has a significant impact on the surrounding environment.

Simulated demolition method: through computer simulation techniques, the demolition process of a building is simulated to determine the appropriate demolition points. This method can accurately estimate the safety of the demolition point, but is low in the demolition efficiency and requires strong computer technology support.

In order to accelerate the demolition speed, synchronous construction is required for the demolition of large buildings. During the construction process, the demolition order of specific areas of the building needs to be considered. Therefore, it is necessary to study a method that can locate the demolition points of the large building based on automatic analysis of the demolition order.

SUMMARY

In view of the above, the present invention provides a method, a medium, and a system for determining demolition points of a large building, capable of locating the demolition points of the large building according to an automatic analysis of a demolition order during a multi-point synchronous demolition of the large building.

The present invention is achieved in that:

A first aspect of the present invention provides a method for determining demolition points of a large building, comprising the following steps:

S10, establishing a three-dimensional model of a large building to be demolished;

S20, analyzing, based on the three-dimensional model of the large building to be demolished, a force condition of each point to form a three-dimensional force model;

S30, calculating, based on the three-dimensional force model of the large building to be demolished, to obtain a demolition point tree of the building; wherein the demolition point tree comprises a plurality of demolition points, a root node of the demolition point tree is a plurality of independent demolition points, and the demolition points are gridded to branch demolition points and leaf demolition points; wherein the branch demolition point is a non-leaf node having one or more sub-demolition points in the demolition point tree, which means that before the demolition of this part, the part represented by the sub-demolition point thereof needs to be demolished first; the branch demolition point represents a complex demolition task, and needs to be demolished in a certain order and step; a leaf demolition point is a leaf node in the demolition point tree, and the leaf demolition point has no sub-demolition point and can be demolished directly, without considering the demolition order of other parts; and S40, marking each demolition point in a demolition point sequence in the three-dimensional model of the large building to be demolished.

On the basis of the above-mentioned technical solution, the method for determining demolition points of a large building of the present invention can be further improved as follows:

Wherein the step of establishing a three-dimensional model of the large building to be demolished specifically comprises:

acquiring a plurality of exterior surface images and a plurality of interior images of the large building to be demolished, wherein the interior images comprise surface images of each structure inside the building;

establishing a three-dimensional surface model of the building from the plurality of exterior surface images; and establishing, based on the spatial relationship between the plurality of interior images and the three-dimensional surface model, a three-dimensional structure corresponding to the interior image in the three-dimensional surface model to form a three-dimensional model of the large building.

wherein the step of analyzing, based on the three-dimensional model of the large building to be demolished, a force condition of each point to form a three-dimensional force model specifically comprises:

establishing a global coordinate system in the three-dimensional model of the large building to be demolished;

gridding the three-dimensional model of the large building to be demolished to a plurality of grid units, wherein points in each of the grid units have similar mechanical characteristics;

calculating, based on the material density of the building and the volume of the grid unit, the mass of each grid unit;

calculating, for each grid unit, the gravity action to which it is subjected;

calculating, for each grid unit, the supporting force to which it is subjected;

adding the gravity action and the supporting force action of each grid unit to obtain the total force to which it is subjected; and mapping the total force of each grid unit to the three-dimensional model of the building to form the three-dimensional force model.

wherein the step of gridding the three-dimensional model of the large building to be demolished to a plurality of grid units specifically comprises:

step 1: extracting geometric information from the three-dimensional model of the large building to be demolished;

step 2: gridding the building based on the structural characteristics and geometric information of the building;

step 3: calculating force data of points in each grid unit, which is a combination of the gravity and support force;

step 4: calculating the mean force value of all points in each grid unit as a reference value;

step 5: calculating the difference between the force values and the reference values of all points, if the ratio of the absolute value of the difference to the reference value is greater than 33%, determining that the grid unit corresponding to the point does not meet the force requirements, and re-gridding that grid unit; and step 6: repeating step 5 until no points that do not meet the force requirements exist.

wherein the step of calculating, based on the three-dimensional force model of the large building to be demolished, to obtain the demolition point tree of the building specifically comprises:

establishing a force matrix based on the three-dimensional force model of the large building to be demolished;

calculating a force balance condition based on the force matrix;

identifying, based on the force balance condition, a unit with the minimum force as a candidate demolition point; and constructing the demolition point tree based on the relationship between candidate demolition points.

wherein the step of calculating, based on the three-dimensional force model of the large building to be demolished, to obtain the demolition point tree of the building specifically comprises:

identifying, based on the three-dimensional force model of the large building to be demolished, main structural components of the building;

determining a demolition priority of the main structural components of the building;

calculating a dependency relationship between the components;

generating the demolition point tree based on the dependency relationship graph between the components; and optimizing the demolition point tree based on a constraint condition in an actual demolition process.

Further, the step of optimizing the demolition point tree based on a constraint condition in an actual demolition process specifically comprises:

evaluating a demolition difficulty at the demolition point;

sorting the demolition point tree based on the demolition difficulty index of the demolition point;

checking the dependency relationship between the demolition points;

analyzing a demolition path between the demolition points;

calculating, based on factors such as the scale of a demolition task, the number and performance of demolition equipment, and the skills of demolition personnel, demolition resource allocation data; and dynamically adjusting the demolition point tree during the demolition process.

A second aspect of the present invention provides a computer-readable storage medium having stored thereon program instructions which, when executed, implement the method for determining demolition points of the large building described above.

A third aspect of the present invention provides a system for determining demolition points of a large building comprising the computer-readable storage medium described above.

Compared with the prior art, the advantageous effect of the method, medium, and system for determining demolition points of a large building provided by the present invention is to divide the demolition points to branch and leaf nodes. There are many demolition points in the process of multi-point simultaneous demolition for a large building, but there are connections between each demolition point. Using this method, the demolition point tree can be established based on the support, force, and other relationships among demolition points, and marked with a three-dimensional model. In the demolition construction, the leaf demolition points are first demolished. The branch demolition point is not demolished until all the leaf demolition points are demolished and that point becomes a leaf demolition point, greatly ensuring the demolish safety. At the same time, with the progress of large building demolition work, the demolition point tree is constantly changing. By using this method, the demolition point tree can be updated in real-time to ensure the efficiency and security of demolition.

BRIEF DESCRIPTION OF DRAWINGS

In order to more clearly illustrate the technical solutions of the embodiments of the present invention, a brief description will be given below of the accompanying drawings which are required to be used in the description of the embodiments of the present invention. It is obvious that the drawings in the description below are only some embodiments of the present invention, and it would be obvious for a person skilled in the art to obtain other drawings according to these drawings without involving any inventive effort.

FIG. 1 is a flowchart of a method for determining demolition points of a large building provided by the present invention.

DETAILED DESCRIPTION OF THE EMBODIMENTS

In order to clarify the purpose, technical solution, and advantages of the embodiments of the present invention, the following will provide a clear and complete description of the technical solutions in the embodiments of the present invention in conjunction with the accompanying drawings. Obviously, the described embodiments are a part of the embodiments of the present invention, not the entire embodiments. Based on the embodiments of the present invention, all other embodiments obtained by a person of ordinary skill in the art without inventive effort fall within the scope of the present invention.

Thus, the following detailed description of the embodiments of the present invention provided in the accompanying drawings is not intended to limit the scope of the claimed invention but is merely representative of selected embodiments of the invention. Based on the embodiments of the present invention, all other embodiments obtained by a person of ordinary skill in the art without inventive effort fall within the scope of the present invention.

As shown in FIG. 1, a flow chart of a method for determining demolition points of a large building according to a first aspect of the present invention comprises the following steps:

S10, establishing a three-dimensional model of a large building to be demolished;

S20, analyzing, based on the three-dimensional model of the large building to be demolished, a force condition of each point to form a three-dimensional force model;

S30, calculating, based on the three-dimensional force model of the large building to be demolished, to obtain a demolition point tree of the building; wherein the demolition point tree comprises a plurality of demolition points, a root node of the demolition point tree is a plurality of independent demolition points, and the demolition points are gridded to branch demolition points and leaf demolition points;

wherein the branch demolition point is a non-leaf node having one or more sub-demolition points in the demolition point tree, which means that before the demolition of this part, the part represented by the sub-demolition point thereof needs to be demolished first; a leaf demolition point is a leaf node in the demolition point tree, and the leaf demolition point has no sub-demolition point and can be demolished directly, without considering the demolition order of other parts; and S40, marking each demolition point in a demolition point sequence in the three-dimensional model of the large building to be demolished.

Generally, the step of establishing the three-dimensional model of the large building to be demolished specifically comprises: firstly, in order to establish a three-dimensional model of the large building to be demolished, drawing data of the building needs to be acquired, including a plan view, an elevation view, a section view, a structure view, etc. of the building. By analyzing and processing these data, the geometric shape, structural composition, material properties, and other information of the building can be obtained.

Next, the three-dimensional model is constructed using computer-aided design (CAD) software, such as AutoCAD, 3ds Max, Revit, etc. based on the acquired drawing data of the building. During the construction, the building needs to be gridded to several members, such as walls, columns, floors, beams, stairs, etc. Each member needs to establish an independent three-dimensional model and assigned corresponding material properties.

When establishing the three-dimensional model of the member, the following algorithms and formulas may be used:

Geometric modeling algorithm: a two-dimensional graphic is converted to a three-dimensional model based on the plan, elevation, and section views of the building using the geometric modeling algorithm. Common geometric modeling algorithms include B-spline curve, NURBS curve, Bezier curve, etc. For example, for a wall member, the planar contour can be converted to a three-dimensional surface by the B-spline curve algorithm.

Structural analysis algorithm: according to the structure diagram of the building, the connection relationship between the members can be calculated by using the structural analysis algorithm. Common structural analysis algorithms include finite element analysis (FEA), boundary element analysis (BEA), etc. For example, for a connection relationship between a floor and a pillar, the force can be calculated by a finite element analysis algorithm.

Material property calculation formula: according to the material properties of a building, the physical properties of each member are calculated by using the calculation formula of material properties. Common material property calculation formulas include Young's modulus formula, Poisson's ratio formula, and density formula. For example, for a concrete wall, the modulus of elasticity can be calculated from Young's modulus formula.

Having the three-dimensional models of the members established, the members need to be assembled into a complete three-dimensional model of the building. In the assembly process, it is necessary to consider the connection relationship between various members and the force conditions, etc. The following algorithms and formulas can be adopted:

Location relationship algorithm: based on the position relationship of each member in the building, the position relationship algorithm is used to calculate the coordinates of each member in three-dimensional space. The commonly used location relationship algorithms include the transformation matrix algorithm, quaternion algorithm, etc. For example, for a positional relationship between a floor and a pillar, the coordinates of the floor in three-dimensional space can be calculated by a transformation matrix algorithm.

Connection relationship algorithm: based on the connection relationship between each member, the interconnection mode of each member in the three-dimensional space is calculated by using the connection relationship algorithm. Common connection relationship algorithms include constraint solving algorithm, topological sorting algorithm, etc. For example, for a connection relationship between a floor and a pillar, the connection manner of the floor and the pillar in the three-dimensional space can be calculated by the constraint solving algorithm.

Force condition formula: based on the force condition of each member, the force distribution of each member in the three-dimensional space is calculated by the force condition formula. Common force condition formulas include stress formula, strain formula, displacement formula, etc. For example, the stress distribution of a floor slab under a certain load can be calculated by the stress formula.

Through the algorithms and formulas above, the three-dimensional model of each member can be assembled into a complete three-dimensional model of the building. Finally, the demolition point information is added to the three-dimensional model to provide the basis for the determination of subsequent demolition points. When adding information about the demolition points, the demolition specifications and methods of buildings can be referred to.

When demolition, the leaf node is first demolished, and the branch node should not be demolished. Till all the leaf nodes of the branch node are demolished, the branch node becomes a leaf node and can be demolished.

The following is a second embodiment of the present invention.

In the above-mentioned technical solution, the step of establishing the three-dimensional model of the large building to be demolished specifically comprises:

acquiring a plurality of exterior surface images and a plurality of interior images of the large building to be demolished, wherein the interior images comprise surface images of each structure inside the building;

establishing a three-dimensional surface model of the building from the plurality of exterior surface images; and establishing, based on the spatial relationship between the plurality of interior images and the three-dimensional surface model, a three-dimensional structure corresponding to the interior image in the three-dimensional surface model to form a three-dimensional model of the large building.

In the second embodiment, firstly, it is necessary to acquire a plurality of exterior surface images and a plurality of interior images of the large building to be demolished. These images can be acquired in a variety of ways, such as by taking pictures of buildings at different angles and distances using equipment such as unmanned aerial vehicles, laser scanners, or digital cameras. During image acquisition, it is necessary to ensure image definition and resolution as much as possible to facilitate subsequent processing and analysis.

Having acquired sufficient exterior and interior images, then, it is necessary to establish a three-dimensional surface model of the building from these images. This process can be done as follows:

preprocessing the acquired exterior surface image, including denoising, graying, and edge detection operations, so as to extract contour information of the building. Common image processing algorithms, such as the Canny edge detection algorithm, Sobel operator, etc. can be used here.

Performing feature point extraction and matching on the pre-processed exterior surface images. SIFT (Scale-Invariant Feature Transform) algorithm, SURF (Speeded-Up Robust Features) algorithm, or ORB (Oriented FAST and Rotated BRIEF) algorithm can be used to extract feature points, and RANSAC (Random Sample Consensus) algorithm can be used to match feature points.

According to the matching result of feature points, the transformation matrix between adjacent images is calculated to realize the image stitching. An image stitching method based on a Homography matrix can be used here.

Three-dimensional reconstruction is performed by using the stitched exterior surface images, and three-dimensional surface model reconstruction of the building is performed by using Structure from Motion (SfM) technology or Multi-View Stereo (MVS) technology.

having the three-dimensional surface model established, a corresponding three-dimensional structure needs to be established inside the model from the interior images. This process can be done as follows:

preprocessing the acquired interior image, including denoising, graying, and edge detection operations, so as to extract contour information about the internal structure of the building;

performing feature point extraction and matching on the pre-processed interior image, wherein the feature point extraction can be done also by using SIFT, SURF, or ORB algorithms, and feature point matching is performed using the RANSAC algorithm; and calculating the spatial relationship between the interior image and the surface model by using the existing three-dimensional surface model and the matching results of the feature points between the interior image; here, a spatial relationship calculation method based on internal and external parameters of the camera can be used, for example, the PnP (Perspective-n-Point) problem is used to solve the camera pose; and based on the calculated spatial relationship, integrating the three-dimensional structure in the interior image to the three-dimensional surface model to form the complete three-dimensional model of the large building; here, point cloud-based fusion methods can be used, for example, point cloud registration and fusion is performed by using the ICP (iterative closest point) algorithm.

Through the above steps, it is possible to establish the three-dimensional model of the large building to be demolished. Having the three-dimensional model established, the demolition points can be further calculated based on the structural information of the building so as to guide the progress of the demolition work. In the whole process, various algorithms and formulas can be used to realize the operation of various steps, so as to improve the accuracy and efficiency of model establishment.

Further, in the second embodiment, in order to obtain more detailed structural information about the building, a laser scanner, a ground penetrating radar, or the like may be used to scan the building to obtain three-dimensional point cloud data of the building.

Having acquired sufficient exterior and interior images, a three-dimensional surface model of the building can be established from these images. First, point cloud data of the exterior surface of the building can be acquired by using a structured light or laser scanner. Then, point cloud data is preprocessed by point cloud data processing software (such as CloudCompare, MeshLab, etc.), including filtering, denoising, smoothing, and other operations, to improve the quality of point cloud data. Then, the point cloud data processing software is used to convert the pre-processed point cloud data to a three-dimensional grid model (such as STL and OBJ formats). Finally, three-dimensional modeling software (such as AutoCAD, sketchUp, etc.) is used to optimize the three-dimensional grid model, including simplifying, filling holes, etc. to generate the three-dimensional surface model of the building.

Having the three-dimensional surface model of the building established, the three-dimensional structure corresponding to the interior image in the three-dimensional surface model needs to be established based on the spatial relationship between the interior image and the three-dimensional surface model. First, the spatial relationship between the interior image and the three-dimensional surface model is calculated using computer vision techniques (such as feature point extraction, matching, etc.). Specifically, SIFT (Scale-Invariant Feature Transform) algorithm, SURF (Speeded-Up Robust Features) algorithm, etc. can be used to extract the feature points in the image, and then RANSAC (Random Sample Consensus) algorithm, etc. can be used to estimate the transformation matrix between the image and the model.

Having the spatial relationship between the interior image and the three-dimensional surface model calculated, the interior image can be projected onto the three-dimensional surface model, and the internal structure can be established in the three-dimensional surface model according to the projection result. Specifically, the interior image may be mapped to the three-dimensional surface model using a ray projection method, a texture mapping method, or the like. Then, according to the mapping result, a corresponding three-dimensional structure, such as a wall, a pillar, a beam, etc. is constructed in the three-dimensional surface model. When constructing internal structures, voxel modeling, CSG (Constructive Solid Geometry) modeling, and other methods can be used to generate three-dimensional structures. Finally, Boolean operations (such as intersection and union) are performed between the internal structure and the three-dimensional surface model to form the complete three-dimensional model of the large building.

In practice, the present invention may be suitably modified and optimized according to specific requirements. For example, data such as material information, load information, etc. of the building may be added when establishing the three-dimensional model to more accurately analyze the demolition order and demolition points of the building. In addition, advanced techniques such as depth learning and SLAM (Simultaneous Localization and Mapping) can be used to improve the calculation accuracy and efficiency when calculating the spatial relationship between the interior image and the three-dimensional surface model.

In the above-mentioned technical solution, the step of analyzing, based on the three-dimensional model of the large building to be demolished, the force condition of each point to form the three-dimensional force model specifically comprises:

establishing a global coordinate system in the three-dimensional model of the large building to be demolished;

gridding the three-dimensional model of the large building to be demolished to a plurality of grid units, wherein points in each of the grid units have similar mechanical characteristics;

calculating, based on the material density of the building and the volume of the grid unit, the mass of each grid unit;

calculating, for each grid unit, the gravity action to which it is subjected;

calculating, for each grid unit, the supporting force to which it is subjected;

adding the gravity action and the supporting force action of each grid unit to obtain the total force to which it is subjected; and mapping the total force of each grid unit to the three-dimensional model of the building to form the three-dimensional force model.

Specifically, this step comprises the following detailed process:

Establishing a global coordinate system: first, a global coordinate system is established in the three-dimensional model of the large building to describe the positions of various points in the building. The global coordinate system may be a Cartesian coordinate system, a spherical coordinate system, or other suitable coordinate system.

Gridding: the three-dimensional model of the building is gridded to a plurality of grid units, and points in each grid unit have similar mechanical characteristics. Gridding may be performed by using finite element methods, finite difference methods, or other suitable methods.

Calculating the mass of the grid unit: the mass of each grid unit is calculated based on the material density of the building and the volume of the grid unit. The mass calculation formula is: $m_i = \rho \times V_i$, where $m_i$ is the mass of the ith grid unit, $\rho$ is the material density, and $v_i$ is the volume of the ith grid unit.

Calculating gravity action: for each grid unit, the gravity action to which it is subjected is calculated. The calculation formula of gravity action is: $F_{gi} = m_i \times g$, where $F_{gi}$ is the gravity action on the ith grid unit, $m_i$ is the mass of the ith grid unit, and g is the gravitational acceleration.

Calculating the action of supporting force: for each grid unit, the supporting force to which it is subjected is calculated. The supporting force can be calculated by the finite element method, finite difference method or other suitable method by analyzing the structure layout and connection mode of the building and considering the elastic modulus and Poisson's ratio of the material.

Calculating the total force: the gravity action, supporting force action, and external load action of each grid unit are added to obtain the total force. The total force calculation formula is $F_total_i = F_{gi} + F_{si} + F_{ei}$: where $F_total_i$ is the total force exerted on the ith grid unit, $F_{gi}$ is the gravitational force exerted on the ith grid unit, $F_{si}$ is the supporting force exerted on the ith grid unit, and $F_{ei}$ is the external load exerted on the ith grid unit.

Forming a three-dimensional force model: the total force of each grid unit is mapped to the three-dimensional model of the building to form the three-dimensional force model. The three-dimensional force model can be used to analyze the force distribution of the building, providing a basis for determining demolition points.

In the above-mentioned technical solution, the step of gridding the three-dimensional model of the large building to be demolished to a plurality of grid units specifically comprises:

step 1: extracting geometric information from the three-dimensional model of the large building to be demolished;

step 2: gridding the building based on the structural characteristics and geometric information of the building;

step 3: calculating force data of points in each grid unit, which is a combination of the gravity and support force;

step 4: calculating the mean force value of all points in each grid unit as a reference value;

step 5: calculating the difference between the force values and the reference values of all points, if the ratio of the absolute value of the difference to the reference value is greater than 33%, determining that the grid unit corresponding to the point does not meet the force requirements, and re-gridding that grid unit; and step 6: repeating step 5 until no points that do not meet the force requirements exist.

Specifically, in order to achieve the division of the three-dimensional model of the building to a plurality of grid units so as to analyze that points in each grid unit have similar mechanical characteristics, we can adopt the following specific embodiments:

Firstly, geometric information, such as vertices, edges, and faces, is extracted from the three-dimensional model of the building. This information can be used to create grid units.

Secondly, according to the structural characteristics and geometric information of the building, a suitable gridding method is selected. Common gridding methods are structured gridding, unstructured gridding, and hybrid gridding.

a) Structured gridding method: in this method, the shape and arrangement of the grid units are regular, such as rectangular or hexagonal. This method is suitable for buildings with regular geometry.
b) Unstructured gridding method: in this method, the shape and arrangement of the grid unit have no fixed rule, such as triangles or tetrahedra. This method is suitable for buildings with complex geometries.
c) Hybrid gridding method: this method combines the advantages of structured and unstructured gridding methods and can be applied to various types of buildings.

The three-dimensional model of the building is gridded to a plurality of grid units based on the selected gridding method. In the gridding process, the size and shape of the grid units need to be considered to ensure that the points in each grid unit have similar mechanical characteristics.

Having the gridding completed, the force of the point in each grid unit is analyzed. This can be achieved by calculating the physical quantities of stress, strain and displacement in each grid unit. Common calculation methods are finite element analysis (FEA) and finite difference method (FDM).

The force characteristics of the points in each grid unit can be derived from the analysis results. Further, these mechanical characteristics can be used to evaluate the structural performance of the building and the demolition strategy.

In summary, with the above embodiments, the three-dimensional model of the building may be gridded to a plurality of grid units, and points in each grid unit are analyzed to have similar mechanical characteristics. This helps to more accurately estimate the demolition point and the demolition process of the building.

In the above-mentioned technical solution, the step of calculating, based on the three-dimensional force model of the large building to be demolished, to obtain the demolition point tree of the building specifically comprises:
establishing a force matrix based on the three-dimensional force model of the large building to be demolished;
calculating a force balance condition based on the force matrix;
identifying, based on the force balance condition, a unit with the minimum force as a candidate demolition point; and
constructing the demolition point tree based on the relationship between candidate demolition points.

Specifically, establishing a force matrix: firstly, the force data of each grid unit of the three-dimensional model of the building needs to be described by a matrix.

Calculating the force balance condition: for each grid unit, a force balance condition needs to be met, i.e. no instability of the building is caused during the demolition process. The force equilibrium condition of each element in the x, y, and z directions can be calculated based on the force matrix. By solving the system of linear equations, the force equilibrium conditions of each element in all directions are obtained.

Obtaining all demolition points: the demolition point is determined on the basis of meeting the force balance conditions. Firstly, a unit with the minimum force is identified as a candidate demolition point based on the force balance condition. A suitable demolition point is then selected among the candidate demolition points based on a demolition order principle (e.g. from top to bottom, from outside to inside, etc.). When selecting the demolition point, it is also necessary to consider the safety in the demolition process and the demolition difficulty.

Constructing a demolition point tree: the demolition point tree is constructed according to the selected demolition points. The demolition point tree is a directed acyclic graph (DAG) in which each node represents a demolition point and a directed edge represents the demolition order. In the demolition point tree, a leaf node represents a unit that can be demolished directly, and a non-leaf node represents a unit that needs to be demolished in a certain order. According to the demolition order principle, the process of constructing the demolition point tree can use a search algorithm such as depth-first search (DFS) or breadth-first search (BFS).

Optimizing the demolition point tree: in order to improve the demolition efficiency, the demolition point tree can be optimized. The optimization method includes merging adjacent demolition points, adjusting the demolition order, etc. In the optimization process, it is necessary to ensure that the topology structure of the demolition point tree satisfies the force equilibrium condition and the demolition order principle.

The following is another embodiment of the step of calculating a demolition point tree of a building based on a three-dimensional force model of the large building to be demolished.

In the above-mentioned technical solution, the step of calculating, based on the three-dimensional force model of the large building to be demolished, to obtain the demolition point tree of the building specifically comprises:
identifying, based on the three-dimensional force model of the large building to be demolished, main structural components of the building;
determining a demolition priority of the main structural components of the building;
calculating a dependency relationship between the components;
generating the demolition point tree based on the dependency relationship graph between the components; and
optimizing the demolition point tree based on a constraint condition in an actual demolition process.

In this embodiment, specifically, analyzing the building structure: based on the three-dimensional force model of the building, the main structural components of the building, such as beams, columns, panels, walls, etc. are identified and numbered.

Determining the demolition priority: for each structural component, its importance in the whole building is analyzed, such as the force condition, structural stability, and other factors, and the demolition priority of each component is determined according to these factors. The priority can be calculated through a certain scoring system, such as scoring each component according to the force size, support area, and other factors, and finally obtaining a priority sequence.

Calculating the dependency relationship between the components: the situation that which each structural component may affect other components during the demolition process is analyzed, such as the demolition of a component may cause other components to change the stress, decrease the structural stability, etc. By analyzing these influence relationships, the dependency relationship graph between components is established.

Generating the demolition point tree: the demolition point tree is generated based on the dependency relationship graph between the components. The root node of the demolition point tree is a plurality of independent demolition points, each representing a structural component to be demolished. The demolition points are gridded to branch demolition points and leaf demolition points. The branch demolition point is a non-leaf node having one or more sub-demolition points in the demolition point tree, which means that before the demolition of this part, the part represented by the sub-demolition point thereof needs to be demolished first; the branch demolition point represents a complex demolition task, and needs to be demolished in a certain order and step; a leaf demolition point is a leaf node in the demolition point tree, and the leaf demolition point has no sub-demolition point and can be demolished directly, without considering the demolition order of other parts.

Optimizing the demolition point tree: based on some constraints in the actual demolition process (such as the performance of demolition equipment, the safety requirements of demolition operation, etc.), the demolition point tree is optimized, and the order and demolition steps between demolition points are adjusted to make the demolition process more smooth, safe, and efficient.

Outputting demolition scheme: the optimized demolition point tree including information about the demolition order, demolition step, and selection of demolition equipment is converted to a specific demolition scheme so as to provide guidance for the actual demolition operation.

Furthermore, in the above-mentioned technical solution, the step of optimizing the demolition point tree based on a constraint condition in the actual demolition process specifically comprises:
- evaluating a demolition difficulty at the demolition point;
- sorting the demolition point tree based on the demolition difficulty index of the demolition point;
- checking the dependency relationship between the demolition points;
- analyzing a demolition path between the demolition points;
- calculating, based on factors such as the scale of a demolition task, the number and performance of demolition equipment, and the skills of demolition personnel, demolition resource allocation data; and
- dynamically adjusting the demolition point tree during the demolition process.

Evaluating the demolition difficulty at the demolition point: for each demolition point, the demolition difficulty index is calculated according to its position in the three-dimensional model, force condition, connection mode, material, and other factors. The demolition difficulty index can be obtained by using the weighted comprehensive score method. Each factor can be quantified assigned a weight and summed up.

Determining the demolition order: the demolition point tree is sorted based on the demolition difficulty index of the demolition point. To reduce the risk and cost in the demolition process, it is preferable to choose the demolition points with less demolition difficulty. For the demolition points with similar demolition difficulties, the demolition order can be further determined based on the spatial location and environmental impact of demolition.

Checking dependency relationship between demolition points: in the demolition point tree, the demolition of some demolition points will affect the demolition of other demolition points. In this case, it is necessary to adjust the demolition order to ensure that the demolition points with less dependency relationship are first demolished, so as to avoid the increase of demolition difficulty caused by improper demolition order.

Analyzing demolition paths between demolition points: in the demolition point tree, the path relationship between the demolition points affects the demolition efficiency. Therefore, it is necessary to analyze the optimal demolition path between demolition points in order to reduce the moving cost in the demolition process. The shortest path algorithm, such as Dijkstra algorithm, Floyd algorithm, and so on, can be used to find the optimal demolition path.

Considering demolition resource allocation: based on factors such as the scale of a demolition task, the number and performance of demolition equipment, and the skills of demolition personnel, the demolition resources are reasonably allocated. Linear programming, integer programming, and other optimization methods can be used to solve the problem of demolition resource allocation to improve demolition efficiency.

Dynamic adjusting the demolition point tree: new demolition points or changes in demolition difficulty may occur during demolition. At this time, the demolition point tree needs to be dynamically adjusted, and the above-mentioned optimization steps are re-performed. The frequency of the dynamic adjustment can be set according to the actual situation of the demolition task.

Verification and correction of removed point trees: in the process of optimizing the demolition point tree, the optimization results need to be verified to ensure the feasibility of the demolition order, path, and resource allocation. If a problem is found, it can be corrected in time and the demolition point tree can be updated according to the correction result.

A second aspect of the present invention provides a computer-readable storage medium having stored thereon program instructions which, when executed, implement the method for determining demolition points of the large building described above.

A third aspect of the present invention provides a system for determining the demolition points of a large building comprising the computer-readable storage medium described above.

The above is only the preferred specific implementation method of the present invention, and the scope of the present invention is not limited to this. Any changes or replacements that can be easily thought of by technical personnel familiar with the technical field within the scope of disclosure in the present invention should be covered within the scope of the present invention. Therefore, the scope of the present invention should be subject to the scope of the claims.

What is claimed is:

1. A method for determining demolition points of a large building, comprising the following steps:
   S10, establishing a three-dimensional model of a large building to be demolished;
   S20, analyzing, based on the three-dimensional model of the large building to be demolished, a force condition of each point to form a three-dimensional force model;
   S30, calculating, based on the three-dimensional force model of the large building to be demolished, to obtain a demolition point tree of the building; wherein the demolition point tree comprises a plurality of demolition points, a root node of the demolition point tree is a plurality of independent demolition points, and the demolition points are gridded to branch demolition points and leaf demolition points; and
   S40, marking each demolition point in a demolition point sequence in the three-dimensional model of the large building to be demolished;
   wherein the step of analyzing, based on the three-dimensional model of the large building to be demolished, a force condition of each point to form a three-dimensional force model specifically comprises:
   establishing a global coordinate system in the three-dimensional model of the large building to be demolished;

gridding the three-dimensional model of the large building to be demolished to a plurality of grid units, wherein points in each of the grid units have similar mechanical characteristics;

calculating, based on the material density of the building and the volume of the grid unit, the mass of each grid unit;

calculating, for each grid unit, the gravity action to which it is subjected;

calculating, for each grid unit, the supporting force to which it is subjected;

adding the gravity action and the supporting force action of each grid unit to obtain the total force to which it is subjected;

mapping the total force of each grid unit to the three-dimensional model of the building to form the three-dimensional force model;

wherein the step of gridding the three-dimensional model of the large building to be demolished to a plurality of grid units specifically comprises:

step 1: extracting geometric information from the three-dimensional model of the large building to be demolished;

step 2: gridding the building based on the structural characteristics and geometric information of the building;

step 3: calculating force data of points in each grid unit, which is a combination of the gravity and support force;

step 4: calculating a mean force value of all points in each grid unit as a reference value;

step 5: calculating a difference between the force values and the reference values of all points, if the ratio of the absolute value of the difference to the reference value is greater than 33%, determining that the grid unit corresponding to the point does not meet the force requirements, and re-gridding that grid unit; and step 6: repeating step 5 until no points that do not meet the force requirements exist;

wherein the step of calculating, based on the three-dimensional force model of the large building to be demolished, to obtain the demolition point tree of the building specifically comprises:

establishing a force matrix based on the three-dimensional force model of the large building to be demolished;

calculating a force balance condition based on the force matrix;

identifying, based on the force balance condition, a unit with the minimum force as a candidate demolition point; and constructing the demolition point tree based on the relationship between candidate demolition points.

2. The method for determining demolition points of a large building of claim 1, wherein the step of establishing the three-dimensional model of the large building to be demolished specifically comprises:

acquiring a plurality of exterior surface images and a plurality of interior images of the large building to be demolished, wherein the interior images comprise surface images of each structure inside the building;

establishing a three-dimensional surface model of the building from the plurality of exterior surface images; and establishing, based on the spatial relationship between the plurality of interior images and the three-dimensional surface model, a three-dimensional structure corresponding to the interior image in the three-dimensional surface model to form a three-dimensional model of the large building.

3. The method for determining demolition points of a large building of claim 1, wherein the step of calculating, based on the three-dimensional force model of the large building to be demolished, the demolition point tree of the building specifically comprises:

identifying, based on the three-dimensional force model of the large building to be demolished, main structural components of the building;

determining a demolition priority of the main structural components of the building;

calculating a dependency relationship between the components;

generating the demolition point tree based on the dependency relationship graph between the components; and optimizing the demolition point tree based on a constraint condition in an actual demolition process.

4. The method for determining demolition points of a large building of claim 3, wherein the step of optimizing the demolition point tree based on the constraint condition in the actual demolition process specifically comprises:

evaluating a demolition difficulty at the demolition point;

sorting the demolition point tree based on the demolition difficulty index of the demolition point;

checking the dependency relationship between the demolition points;

analyzing a demolition path between the demolition points;

calculating, based on factors of the scale of a demolition task, the number and performance of demolition equipment, and the skills of demolition personnel, demolition resource allocation data; and dynamically adjusting the demolition point tree during the demolition process.

5. A non-transitory computer-readable storage medium having stored thereon program instructions which, when executed, implement the method for determining demolition points of a large building of claim 1.

6. A system for determining demolition points of a large building, comprising the non-transitory computer-readable storage medium of claim 5.

* * * * *